United States Patent
Yoon et al.

(10) Patent No.: US 10,483,502 B2
(45) Date of Patent: Nov. 19, 2019

(54) BATTERY CELL HAVING ANTI-WRINKLE MEMBER

(71) Applicant: LG Chem, Ltd., Seoul (KR)

(72) Inventors: Sung Pil Yoon, Daejeon (KR); Jin Soo Lee, Daejeon (KR); Joo Hwan Sung, Daejeon (KR); Seong Min Kim, Daejeon (KR); Jung Koo Kang, Daejeon (KR); Ju Bin Kim, Daejeon (KR); Hae Jin Lim, Daejeon (KR); Seunghe Woo, Daejeon (KR)

(73) Assignee: LG Chem, Ltd. (KR)

( * ) Notice: Subject to any disclaimer, the term of this patent is extended or adjusted under 35 U.S.C. 154(b) by 373 days.

(21) Appl. No.: 15/117,341

(22) PCT Filed: Oct. 31, 2014

(86) PCT No.: PCT/KR2014/010324
§ 371 (c)(1),
(2) Date: Aug. 8, 2016

(87) PCT Pub. No.: WO2015/122594
PCT Pub. Date: Aug. 20, 2015

(65) Prior Publication Data
US 2016/0351864 A1 Dec. 1, 2016

(30) Foreign Application Priority Data

Feb. 14, 2014 (KR) .................. 10-2014-0017163
Feb. 14, 2014 (KR) .................. 10-2014-0017225

(51) Int. Cl.
*H01M 6/46* (2006.01)
*H01M 2/02* (2006.01)
(Continued)

(52) U.S. Cl.
CPC ......... *H01M 2/0287* (2013.01); *H01M 2/021* (2013.01); *H01M 2/026* (2013.01);
(Continued)

(58) Field of Classification Search
CPC .... H01M 2/0528; H01M 2/021; H01M 2/026; H01M 2/0262; H01M 2/0277;
(Continued)

(56) References Cited

U.S. PATENT DOCUMENTS

| 6,599,659 | B1 | 7/2003 | Endo et al. |
| 7,332,243 | B2 * | 2/2008 | Cummins ............... B60R 16/04 |
| | | | 429/160 |

(Continued)

FOREIGN PATENT DOCUMENTS

| JP | 03049150 A | * | 3/1991 |
| JP | 2000173559 A | | 6/2000 |

(Continued)

OTHER PUBLICATIONS

International Search Report from PCT/KR2014/010324, dated Feb. 17, 2015.

(Continued)

*Primary Examiner* — Jane J Rhee
(74) *Attorney, Agent, or Firm* — Lerner, David, Littenberg, Krumholz & Mentlik, LLP (57) ABSTRACT

Disclosed herein is a battery cell configured to have a structure in which an electrode assembly, including positive electrodes and negative electrodes stacked in the state in which separators are disposed respectively between the positive electrodes and the negative electrodes, is mounted in a cell case in the state in which the electrode assembly is impregnated with an electrolyte, wherein the electrode assembly and the cell case are deformable in response to the shape of a device in which the battery cell is mounted, and (Continued)

anti-wrinkle members, for preventing wrinkles from being formed in the cell case when the cell case is deformed, are added to at least portions of the outer surfaces of the electrode assembly.

25 Claims, 9 Drawing Sheets

(51) Int. Cl.
  *H01M 2/10* (2006.01)
  *H01M 10/04* (2006.01)
  *H01M 2/16* (2006.01)
(52) U.S. Cl.
  CPC ....... *H01M 2/0262* (2013.01); *H01M 2/0277* (2013.01); *H01M 2/0292* (2013.01); *H01M 2/1094* (2013.01); *H01M 2/1606* (2013.01); *H01M 10/0413* (2013.01); *H01M 10/0436* (2013.01); *H01M 2002/0297* (2013.01); *H01M 2220/20* (2013.01); *H01M 2220/30* (2013.01)
(58) Field of Classification Search
  CPC ............. H01M 2/0292; H01M 2/1094; H01M 2/1606; H01M 10/0413; H01M 10/0436; H01M 2002/0297; H01M 2220/20; H01M 2220/30
  See application file for complete search history.

(56) References Cited

U.S. PATENT DOCUMENTS

| | | |
|---|---|---|
| 2006/0093902 A1 | 5/2006 | Lee |
| 2007/0096688 A1 | 5/2007 | Suzuki et al. |
| 2008/0107963 A1* | 5/2008 | Lee .................... H01M 2/0275 429/174 |
| 2013/0244093 A1* | 9/2013 | Min .................... H01M 2/0287 429/185 |

FOREIGN PATENT DOCUMENTS

| | | |
|---|---|---|
| JP | 2000306611 A | 11/2000 |
| JP | 2003123706 A | 4/2003 |
| JP | 2004039271 A | 2/2004 |
| JP | 2006049054 A | 2/2006 |
| JP | 2006172766 A | 6/2006 |
| JP | 5063895 B2 | 10/2012 |
| KR | 100841905 B1 | 6/2008 |

OTHER PUBLICATIONS

Extended European Search Report for Application No. EP14882221.6 dated Dec. 22, 2016.

\* cited by examiner

BATTERY CELL HAVING ANTI-WRINKLE MEMBER

CROSS-REFERENCE TO RELATED APPLICATION

This application is a national phase entry under 35 U.S.C. § 371 of International Application No. PCT/KR2014/010324, filed Oct. 31, 2014, which claims priority to Korean Patent Application No. 10-2014-0017225, filed Feb. 14, 2014 and Korean Patent Application No. 10-2014-0017163, filed Feb. 14, 2014, the disclosures of which are incorporated herein by reference.

TECHNICAL FIELD

The present invention relates to a battery cell having anti-wrinkle members for preventing wrinkles from being formed in a cell case when the cell case is deformed, wherein the anti-wrinkle members are added to at least portions of the inner surfaces of the cell case facing the outermost electrodes of the electrode assembly or to at least portions of the outer surfaces of the electrode assembly, thereby effectively preventing wrinkles from being formed in the cell case when the battery cell is deformed due to implementation in devices having various designs.

BACKGROUND ART

In recent years, secondary batteries have been increasingly used. In terms of the shape of batteries, the demand for prismatic secondary batteries or pouch-shaped secondary batteries, which are thin enough to be applied to products, such as mobile phones, is very high. In terms of the material for batteries, meanwhile, the demand for lithium secondary batteries, such as lithium ion batteries and lithium ion polymer batteries, which exhibit high energy density, discharge voltage, and output stability, is very high.

In addition, secondary batteries may be classified based on the structure of an electrode assembly having a positive electrode/separator/negative electrode structure. For example, the electrode assembly may be configured to have a jelly-roll (wound) type structure in which a long sheet type positive electrode and a long sheet type negative electrode are wound in the state in which a separator is disposed between the positive electrode and the negative electrode, a stacked type structure in which pluralities of positive electrodes and negative electrodes each having a predetermined size are sequentially stacked in the state in which separators are disposed respectively between the positive electrodes and the negative electrodes, or a stacked/folded type structure in which predetermined numbers of positive electrodes and negative electrodes are sequentially stacked in the state in which separators are disposed respectively between the positive electrodes and the negative electrodes to constitute a bi-cell or a full cell, and then a plurality of bi-cells or full cells is folded using a separation film.

In recent years, much interest has been taken in a pouch-shaped battery configured to have a structure in which such a stacked or stacked/folded type electrode assembly is mounted in a pouch-shaped battery case made of an aluminum laminate sheet because of low manufacturing costs, light weight, easy modification in shape, etc. In addition, the use of such a pouch-shaped battery has gradually increased.

Figure 1:
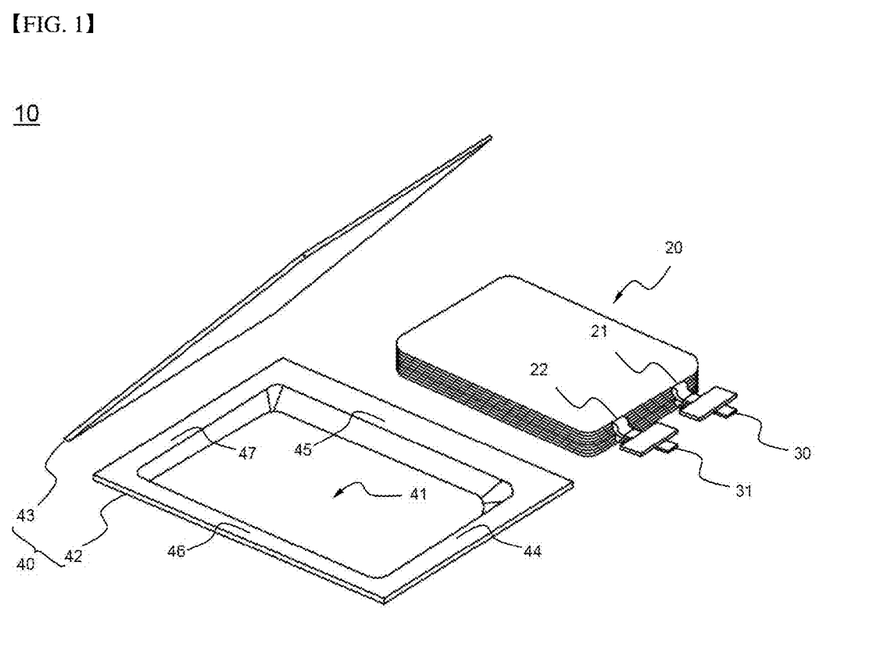
FIGS. 1 and 2 are exploded perspective views showing a conventional representative pouch-shaped secondary battery.
Figure 2:
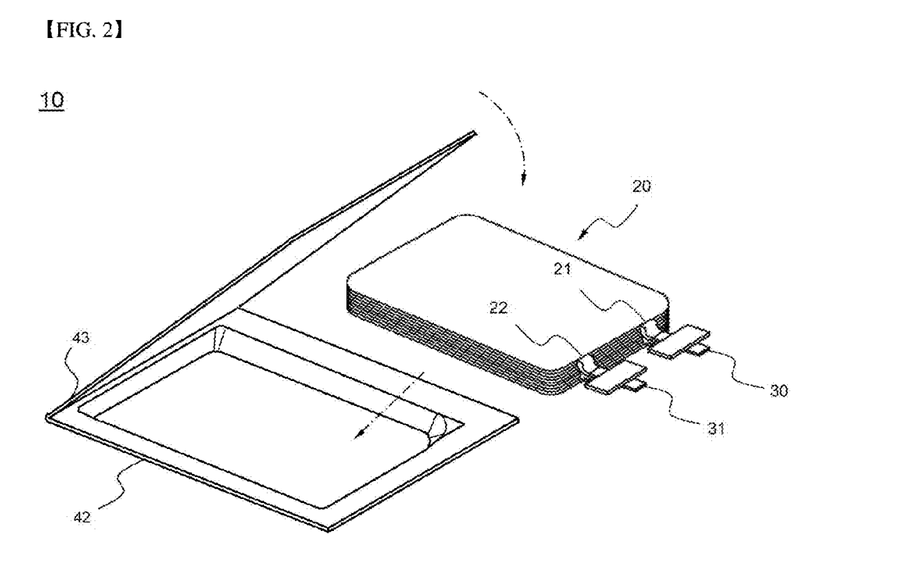

FIGS. 1 and 2 are exploded perspective views typically showing a general structure of a conventional representative pouch-shaped secondary battery.

Referring to FIG. 1, a pouch-shaped secondary battery 10 includes a stacked type electrode assembly 20 having pluralities of electrode tabs 21 and 22 protruding therefrom, two electrode leads 30 and 31 respectively connected to the electrode tabs 21 and 22, and a battery case 40, in which the stacked type electrode assembly 20 is received in a sealed state such that the electrode leads 30 and 31 are partially exposed outward from the battery case 40.

The battery case 40 includes a lower case 42 having a depressed receiving part 41, in which the stacked type electrode assembly 20 is located, and an upper case 43 for covering the lower case 42 such that the electrode assembly 20 is sealed in the battery case 40. The upper case 43 and the lower case 42 are connected to each other by thermal welding in the state in which the stacked type electrode assembly 20 is mounted therein to form an upper end sealed part 44, side sealed parts 45 and 46, and a lower end sealed part 47.

As shown in FIG. 1, the upper case 43 and the lower case 42 may be configured as separate members. As shown in FIG. 2, on the other hand, one end of the upper case 43 may be integrally formed at a corresponding end of the lower case 42 such that the upper case 43 and the lower case 42 may be hingedly connected to each other.

In addition, as shown in FIGS. 1 and 2, the pouch-shaped battery cell is configured to have a structure in which electrode terminals constituted by the electrode tabs and the electrode leads connected to the electrode tabs are formed at one end of the electrode assembly. Alternatively, a pouch-shaped battery cell configured to have a structure in which electrode terminals are formed at one end and the other end of an electrode assembly may also be manufactured using the above-described method.

Meanwhile, FIGS. 1 and 2 show the pouch-shaped battery cell having the stacked type electrode assembly. Alternatively, a pouch-shaped battery cell having a wound type or jelly-roll type electrode assembly may also be manufactured using the above-described method.

As shown in FIGS. 1 and 2, the pouch-shaped battery cell is generally configured to have an approximately rectangular hexahedral shape.

However, devices, to which the pouch-shaped battery cell is applied, may be configured to have various shapes other than a rectangular hexahedral shape. The devices may even be configured to have a curved shape. For example, the sides of a smart phone may be curved so as to be easier to grip, and a flexible display device may be curved or bent. That is, the flexible display device may be manufactured to have various shapes.

In the case in which a battery cell or battery pack configured to have a rectangular hexahedral shape is mounted in a device designed so as to have such curved parts or a device that can be curved, however, the efficiency of utilization of the space in the device may be lowered. In recent years, it has been required for the battery cell to be flexible such that the battery cell can be easily mounted in devices configured to have various kinds of designs.

In a device designed so as to have such curved parts or a deformable device that can be curved or bent, however, a cell case may be damaged when a battery cell received in the device is deformed, with the result that a metal layer may be exposed from the cell case or an electrolyte may leak from the cell case.

Therefore, there is a high necessity for technology that is capable of ensuring the safety of a battery even when the battery is deformed while solving the above problems.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have found that, in the case in which anti-wrinkle members, for preventing wrinkles from being formed in a cell case when the cell case is deformed, are added to at least portions of the inner surfaces of the cell case facing the outermost electrodes of the electrode assembly or to at least portions of the outer surfaces of the electrode assembly, as will be described hereinafter, it is possible to effectively prevent wrinkles from being formed in the cell case when the battery cell is deformed due to implementation in devices having various designs. The present invention has been completed based on these findings.

Technical Solution

In accordance with one aspect of the present invention, the above and other objects can be accomplished by the provision of a battery cell configured to have a structure in which an electrode assembly is mounted in a cell case in the state in which the electrode assembly is impregnated with an electrolyte, wherein the electrode assembly and the cell case are deformable in response to the shape of a device in which the battery cell is mounted, and anti-wrinkle members, for preventing wrinkles from being formed in the cell case when the cell case is deformed, are added to at least portions of the inner surfaces of the cell case facing the outermost electrodes of the electrode assembly.

In this case, the cell case may have an uneven shape, which is formed by the anti-wrinkle members added to the inner surfaces of the cell case.

In a concrete example, each of the anti-wrinkle members may have a reticular structure. Specifically, each of the anti-wrinkle members may include a plurality of woven or non-woven fibers. In this case, the surface of the cell case may have an uneven shape, which is formed by the anti-wrinkle members added to the inner surfaces of the cell case.

The inventors of the present application have found that, in the case in which anti-wrinkle members, each having a reticular structure in which a plurality of fibers is woven in the shape of a net, are added to at least portions of the inner surfaces of a cell case of a battery cell, the anti-wrinkle members, the fibers of which are regularly or irregularly arranged, are pressed against the inner surfaces of the cell case during the manufacture of the battery cell, whereby an uneven shape is formed on the surface of the cell case, and stress generated in the cell case due to the deformation of the battery cell is released by the uneven shape, with the result that it is possible to maximally prevent wrinkles from being formed in the cell case.

At the result of maximally preventing unintentional wrinkles from being formed in the cell case, it is possible to effectively prevent the exposure of a metal layer of the cell case or the leakage of an electrolyte, which may be caused by damage to the cell case which occurs due to wrinkles formed in the pouch-shaped cell case, thereby greatly improving the safety of the battery cell.

For example, the reticular structure may have a continuous honeycomb pattern, a continuous lattice pattern, or a continuous diamond pattern, when viewed from above. However, the present invention is not limited thereto.

Each line constituting the reticular structure may have a thickness of 100 nm to 100 μm. In the case in which the thickness of each line is less than 100 nm, it is difficult to form an uneven shape having a sufficient size to prevent wrinkles from being formed in the cell case. In addition, it is difficult to exhibit a sufficient tensile strength to support the surface of the cell case, with the result that the anti-wrinkle members may be easily damaged even when the cell case is only slightly deformed. In the case in which the thickness of each line is greater than 100 μm, on the other hand, the thickness of each other anti-wrinkle members may be excessively increased, with the result that the volume of the battery cell may be increased.

Each of the anti-wrinkle members according to the present invention may be a plate-shaped member having a small thickness that is capable of minimizing the increase in volume of the battery cell. For example, each of the anti-wrinkle members may be a sheet type member.

In the case in which each of the anti-wrinkle members is a sheet type member, each of the anti-wrinkle members may have a porous structure in which a plurality of pores is formed in the sheet type member such that an uneven shape is formed on the surface of the cell case. In this case, each of the pores may have a diameter of 0.1 mm to 1 mm, and the pores may be arranged at intervals of 300% to 1000% the diameter of each of the pores.

Meanwhile, the material for each of the anti-wrinkle members is not particularly restricted as long as the material for each of the anti-wrinkle members exhibits high electrical insulation and can be easily formed in various shapes. In a concrete example, each of the anti-wrinkle members may be made of a polymer material. The polymer material may be polyethylene (PE), polypropylene (PP), polystyrene (PS), polyethylene terephthalate (PET), polymethyl methacrylate (PMMA), polyacrylonitrile (PAN), silicone resin, natural rubber, or synthetic rubber.

In another concrete example, each of the anti-wrinkle members may be made of a metal material coated with an insulative material. For example, the metal material may be aluminum, copper, iron, nickel, or silver, and the insulative material may be polyolefin resin, fluorocarbon resin, silicone resin, or rubber resin.

Meanwhile, the anti-wrinkle members according to the present invention may be added to the cell case in various manners. Specifically, in the case in which the anti-wrinkle members are added to at least portions of the inner surfaces of the cell case, the anti-wrinkle members may be tightly attached to the inner surfaces of the cell case in order to effectively prevent wrinkles from being formed in the cell case. More specifically, the anti-wrinkle members may be thermally welded or bonded to the inner surfaces of the cell case. For example, the anti-wrinkle members may be bonded to the inner surfaces of the cell case using an unsaturated polyester adhesive, a polyacrylate adhesive, such as a polyester acrylate adhesive, an epoxy acrylate adhesive, or a urethane acrylate adhesive, or a silicone adhesive. However, the present invention is not limited thereto.

That is, in the battery cell according to the present invention, the anti-wrinkle members may be thermally welded or bonded to the inner surfaces of the deformable portions of the cell case. As a result, the anti-wrinkle members are integrated with the inner surfaces of the cell case so as to support the cell case such that the cell case is not deformed, thereby effectively preventing wrinkles from being formed in the cell case.

The positions at which the anti-wrinkle members are added to the inner surfaces of the cell case are not particularly restricted. In a concrete example, the anti-wrinkle members may be added to the most bendable portions of the cell case, in which a large number of wrinkles are formed. Specifically, the anti-wrinkle members may be added respectively to the upper inner surface of the cell case facing the uppermost electrode of the electrode assembly and to the lower inner surface of the cell case facing the lowermost electrode of the electrode assembly.

This is because, in the case in which a battery cell is bent in response to the shape of a curved device, pressure to deform the battery cell is applied in the direction in which electrodes of the battery cell are stacked, with the result that a large number of wrinkles are formed in the surface of the cell case located on an inner side in the direction in which the battery cell is bent, i.e. the upper surface or the lower surface of the cell case.

Particularly, in the case in which the case in which the battery cell is applied to a device configured to have a curved structure in which opposite ends of the device are bent in the same direction from the middle of the device in vertical section in the axial direction thereof, stress may be concentrated on the middle portion of the battery cell. For this reason, the anti-wrinkle members may be added to portions of the inner surfaces of the cell case adjacent to a vertical axis passing through the middle of the electrode assembly.

Specifically, the middle of each of the anti-wrinkle members may be located on the vertical axis passing through the middle of the electrode assembly, and the anti-wrinkle members may be added to portions of the inner surfaces of the cell case equivalent to 20% to 100% the entire area of the electrode assembly.

In addition, each of the anti-wrinkle members according to the present invention may have a small thickness to minimize the volume of the battery cell. Specifically, each of the anti-wrinkle members may have a thickness of 0.1 μm to 150 μm.

In the case in which the thickness of each of the anti-wrinkle members is less than 0.1 μm, it is difficult to form an uneven shape necessary to prevent the formation of wrinkles in each of the anti-wrinkle members, which is undesirable. In the case in which the thickness of each of the anti-wrinkle members is greater than 150 μm, on the other hand, the material for the anti-wrinkle members is excessively used, which is not economical. In addition, the volume of the anti-wrinkle members is increased, whereby the total size of the battery cell is increased, with the result that the ratio of spatial efficiency to effect is reduced, which is also undesirable.

In accordance with another aspect of the present invention, there is provided a battery cell configured to have a structure in which an electrode assembly, including positive electrodes and negative electrodes stacked in the state in which separators are disposed respectively between the positive electrodes and the negative electrodes, is mounted in a cell case in the state in which the electrode assembly is impregnated with an electrolyte, wherein the electrode assembly and the cell case are deformable in response to the shape of a device in which the battery cell is mounted, and anti-wrinkle members, for preventing wrinkles from being formed in the cell case when the cell case is deformed, are added to at least portions of the outer surfaces of the electrode assembly.

In this case, the cell case may have an uneven shape, which is formed by the anti-wrinkle members added to the outer surfaces of the electrode assembly.

In a concrete example, each of the anti-wrinkle members may have a reticular structure. Specifically, each of the anti-wrinkle members may include a plurality of woven or non-woven fibers. In this case, the surface of the cell case may have an uneven shape, which is formed by the anti-wrinkle members added to the inner surfaces of the cell case.

The inventors of the present application have found that, in the case in which anti-wrinkle members, each having a reticular structure in which a plurality of fibers is woven in the shape of a net, are added to at least portions of the outer surfaces of an electrode assembly of a battery cell, the anti-wrinkle members, the fibers of which are regularly or irregularly arranged, are pressed against the inner surfaces of the cell case during the manufacture of the battery cell, whereby an uneven shape is formed on the surface of the cell case, and stress generated in the cell case due to the deformation of the battery cell is released by the uneven shape, with the result that it is possible to maximally prevent wrinkles from being formed in the cell case.

At the result of maximally preventing unintentional wrinkles from being formed in the cell case, it is possible to effectively prevent the exposure of a metal layer of the cell case or the leakage of an electrolyte, which may be caused by damage to the cell case which occurs due to wrinkles formed in the pouch-shaped cell case, thereby greatly improving the safety of the battery cell.

For example, the reticular structure may have a continuous honeycomb pattern, a continuous lattice pattern, or a continuous diamond pattern, when viewed from above. However, the present invention is not limited thereto.

Each line constituting the reticular structure may have a thickness of 100 nm to 100 μm. In the case in which the thickness of each line is less than 100 nm, it is difficult to form an uneven shape having a sufficient size to prevent wrinkles from being formed in the cell case. In addition, it is difficult to exhibit a sufficient tensile strength to support the surface of the cell case, with the result that the anti-wrinkle members may be easily damaged even when the cell case is only slightly deformed. In the case in which the thickness of each line is greater than 100 μm, on the other hand, the thickness of each other anti-wrinkle members may be excessively increased, with the result that the volume of the battery cell may be increased.

Each of the anti-wrinkle members according to the present invention may be a plate-shaped member having a small thickness that is capable of minimizing the increase in volume of the battery cell. For example, each of the anti-wrinkle members may be a sheet type member.

In the case in which each of the anti-wrinkle members is a sheet type member, each of the anti-wrinkle members may have a porous structure in which a plurality of pores is formed in the sheet type member such that an uneven shape is formed on the surface of the cell case. In this case, each of the pores may have a diameter of 0.1 mm to 1 mm, and the pores may be arranged at intervals of 300% to 1000% the diameter of each of the pores.

Meanwhile, the material for the each of the anti-wrinkle members is not particularly restricted as long as the material for each of the anti-wrinkle members exhibits high electrical insulation and can be easily formed in various shapes. In a concrete example, each of the anti-wrinkle members may be made of a polymer material. The polymer material may be polyethylene (PE), polypropylene (PP), polystyrene (PS), polyethylene terephthalate (PET), polymethyl methacrylate (PMMA), polyacrylonitrile (PAN), silicone resin, natural rubber, or synthetic rubber.

In another concrete example, each of the anti-wrinkle members may be made of a metal material coated with an insulative material. For example, the metal material may be aluminum, copper, iron, nickel, or silver, and the insulative material may be polyolefin resin, fluorocarbon resin, silicone resin, and rubber resin.

In the battery cell according to the present invention, in the case in which the anti-wrinkle members are added to at least portions of the outer surfaces of the electrode assembly, the anti-wrinkle members may be attached to the outer surfaces of the electrode assembly. Specifically, a mixture of the electrode assembly may be partially introduced into the reticular structure of each of the anti-wrinkle members such that each of the anti-wrinkle members is integrated with the electrode assembly.

Additionally, in the case in which the anti-wrinkle members are added to at least portions of the inner surfaces of the cell case, the anti-wrinkle members may be tightly attached to the outer surfaces of the electrode assembly in order to effectively prevent wrinkles from being formed in the cell case. More specifically, the anti-wrinkle members may be thermally welded or bonded to the inner surfaces of the cell case. For example, the anti-wrinkle members may be bonded to the inner surfaces of the cell case using an unsaturated polyester adhesive, a polyacrylate adhesive, such as a polyester acrylate adhesive, an epoxy acrylate adhesive, or a urethane acrylate adhesive, or a silicone adhesive. However, the present invention is not limited thereto.

That is, in the battery cell according to the present invention, the anti-wrinkle members may be thermally welded or bonded to the outer surfaces of the electrode assembly. As a result, the anti-wrinkle members are integrated with the outer surfaces of the electrode assembly so as to support the cell case such that the cell case is not deformed, thereby effectively preventing wrinkles from being formed in the cell case.

The positions at which the anti-wrinkle members are added to the outer surfaces of the electrode assembly are not particularly restricted. In a concrete example, the anti-wrinkle members may be added to the most bendable portions of the electrode assembly, in which a large number of wrinkles are formed. Specifically, in the case in which the anti-wrinkle members are added to at least portions of the outer surfaces of the electrode assembly, the anti-wrinkle members may be added respectively to the uppermost electrode of the electrode assembly facing the upper inner surface of the cell case and to the lowermost electrode of the electrode assembly facing the lower inner surface of the cell case.

This is because, in the case in which a battery cell is bent in response to the shape of a curved device, pressure to deform the battery cell is applied in the direction in which electrodes of the battery cell are stacked, with the result that a large number of wrinkles are formed in the surface of the cell case located on an inner side in the direction in which the battery cell is bent, i.e. the upper surface or the lower surface of the cell case.

Particularly, in the case in which the case in which the battery cell is applied to a device configured to have a curved structure in which opposite ends of the device are bent in the same direction from the middle of the device in vertical section in the axial direction thereof, stress may be concentrated on the middle portion of the battery cell. For this reason, the anti-wrinkle members may be added to middle portions of the outer surfaces of the electrode assembly.

Specifically, in the case in which the anti-wrinkle members are added to at least portions of the outer surfaces of the electrode assembly, the middle of each of the anti-wrinkle members may be located on the vertical axis passing through the middle of the electrode assembly, and the anti-wrinkle members may be added to portions of the outer surfaces of the electrode assembly equivalent to 20% to 100% the entire area of the electrode assembly.

In addition, each of the anti-wrinkle members according to the present invention may have a small thickness to minimize the volume of the battery cell. Specifically, each of the anti-wrinkle members may have a thickness of 0.1 µm to 150 µm.

In the case in which the thickness of each of the anti-wrinkle members is less than 0.1 µm, it is difficult to form an uneven shape necessary to prevent the formation of wrinkles on each of the anti-wrinkle members, which is undesirable. In the case in which the thickness of each of the anti-wrinkle members is greater than 150 µm, on the other hand, the material for the anti-wrinkle members is excessively used, which is not economical. In addition, the volume of the anti-wrinkle members is increased, whereby the total size of the battery cell is increased, with the result that the ratio of spatial efficiency to effect is reduced, which is also undesirable.

Meanwhile, the cell case of the present invention may exhibit high flexibility, due to which the battery cell can be easily mounted in devices having various designs. Specifically, the cell case may be a pouch-shaped case made of a laminate sheet including a resin layer and a metal layer.

The laminate sheet may be an aluminum laminate sheet. Specifically, the laminate sheet may be configured to have a structure in which an outer resin layer exhibiting high durability is added to one major surface (the outer surface) of a metal blocking layer and a resin sealant layer exhibiting a high thermal bonding property is attached to the other major surface (the inner surface) of the metal blocking layer.

It is required for the outer resin layer to exhibit high resistance to the external environment. Consequently, it is required for the outer resin layer to exhibit more than predetermined tensile strength and weather resistance. For this reason, the outer resin layer may be made of a polymer resin, such as polyethylene terephthalate (PET) or oriented nylon film.

It is required for the metal blocking layer to have a function of increasing the strength of the cell case in addition to a function of preventing the introduction or leakage of foreign matter, such as gas or moisture. To this end, the metal blocking layer may be made of, for example, aluminum.

The resin sealant layer may be made of a polyolefin resin which exhibits a high thermal welding property (thermal adhesive property) and a low hygroscopic property, which is necessary to restrain the permeation of an electrolyte, and is not expanded or is not corroded by the electrolyte. More specifically, the resin sealant layer may be made of cast polypropylene (CPP).

In general, a polyolefin resin, such as polypropylene, has low adhesion to metal. For this reason, an adhesive layer may be further disposed between the resin sealant layer and the metal blocking layer so as to improve adhesion between the resin sealant layer and the metal blocking layer and to improve blocking characteristics. The adhesive layer may be made of, for example, urethane, acryl, or thermoplastic elastomer, to which, however, the material for the adhesive layer is not limited.

In addition, the structure of the electrode assembly, which is mounted in the deformable cell case in the state in which the electrode assembly is impregnated with the electrolyte, is not particularly restricted as long as the electrode assembly has a plate-shaped structure configured to have a structure in which a plurality of electrode tabs is connected to constitute the positive electrode and the negative electrode of the electrode assembly. Specifically, the electrode assembly may be a stacked type electrode assembly, configured to have a structure in which sheet type positive electrodes and negative electrodes are stacked in the state in which separators are disposed respectively between the positive electrodes and the negative electrodes, a stacked/folded type electrode assembly, configured to have a structure in which predetermined numbers of positive electrodes and negative electrodes are sequentially stacked in the state in which separators are disposed respectively between the positive electrodes and the negative electrodes to constitute a bi-cell or a full cell, and then a plurality of bi-cells or full cells is folded using a separation film, or a laminated/stacked type electrode assembly, configured to have a structure in which bi-cells or full cells are stacked in the state in which separators are disposed respectively between the bi-cells or the full cells.

The bi-cell may be configured to have a stacked structure in which electrodes having the same polarity are located on opposite sides of the cell. For example, the bi-cell may be a cell including a positive electrode, a separator, a negative electrode, a separator, and a positive electrode or a cell including a negative electrode, a separator, a positive electrode, a separator, and a negative electrode. The full cell may be configured to have a stacked structure in which electrodes having different polarities are located on opposite sides of the cell. For example, the full cell may be a cell including a positive electrode, a separator, and a negative electrode.

In accordance with other aspects of the present invention, there are provided a battery module including two or more battery cells with the above-stated construction and a battery pack including the battery module.

In accordance with a further aspect of the present invention, there is provided a device including the battery pack as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 3:
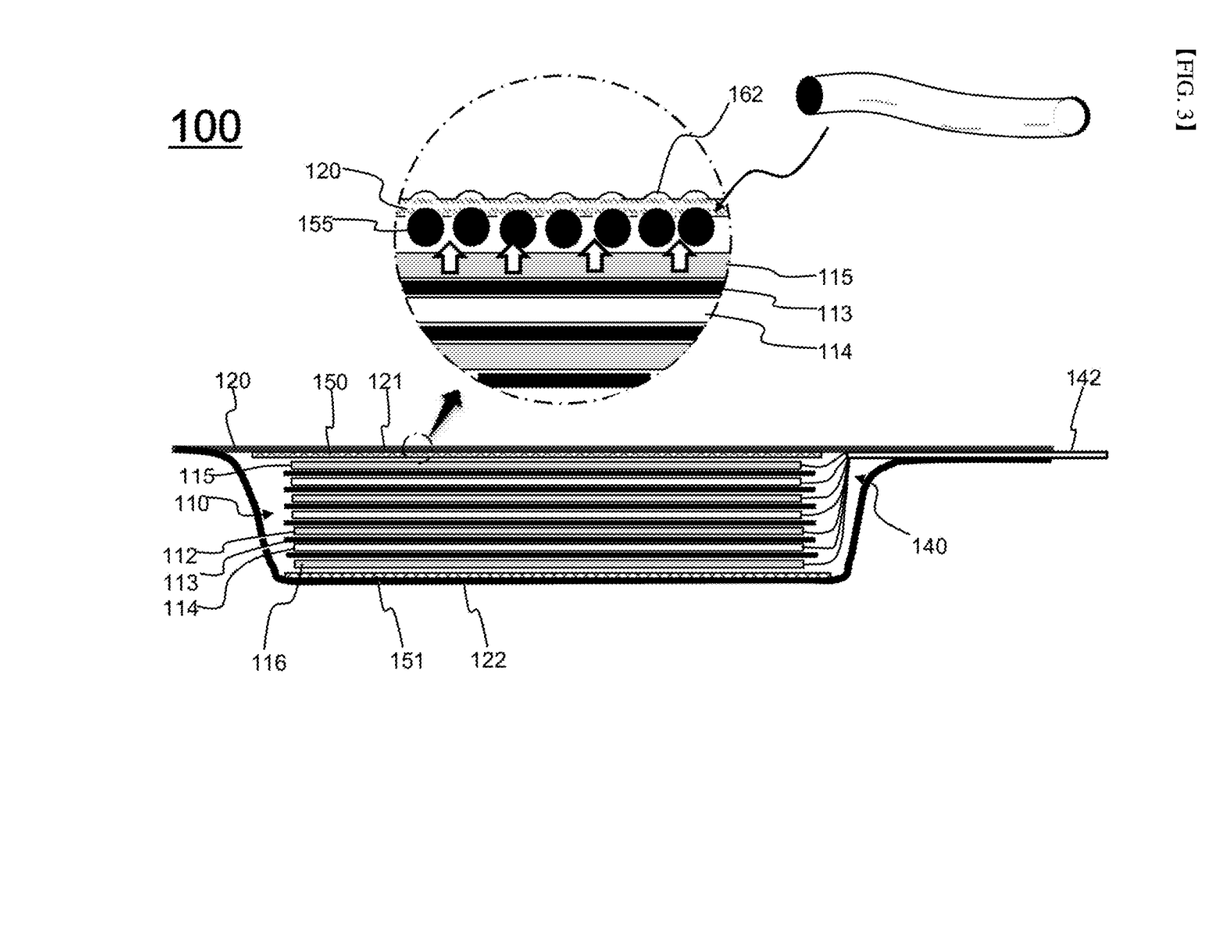
FIG. 3 is a sectional view typically showing the internal structure of a battery cell according to an embodiment of the present invention.

FIG. 3 is a sectional view typically showing the internal structure of a battery cell according to an embodiment of the present invention.

Referring to FIG. 3, a battery cell 100 according to the present invention is configured to have a structure in which a stacked type electrode assembly 110, which is configured to have a structure in which sheet type positive electrodes 112 and negative electrodes 114 are stacked in the state in which separators 113 are disposed respectively between the positive electrodes 112 and the negative electrodes 114, is mounted in a pouch-shaped cell case 120 in the state in which the electrode assembly 110 is impregnated with an electrolyte (not shown). Electrode tabs 140 and electrode leads 142 are formed at one side of the battery cell 100.

The electrode assembly 110 and the pouch-shaped cell case 120 may be deformable in response to the shape of a device, in which the battery cell 100 is to be mounted. In order to prevent wrinkles from being formed in the upper surface or the lower surface of the pouch-shaped cell case 120 when the battery cell is bent in response to the shape of a curved device, anti-wrinkle members 150 and 151 are bonded respectively to the upper inner surface 121 of the pouch-shaped cell case 120 facing the uppermost electrode 115 of the electrode assembly 110 and to the lower inner surface 122 of the pouch-shaped cell case 120 facing the lowermost electrode 116 of the electrode assembly 110.

Each of the anti-wrinkle members 150 and 151 is configured to have a reticular structure. Each of the anti-wrinkle members 150 and 151 may be made of a plastic material, such as polyethylene terephthalate (PET), or a metal material, such as aluminum. In the case in which each of the anti-wrinkle members 150 and 151 is made of a metal material, the surface of each of the anti-wrinkle members 150 and 151 is coated with an insulative material, such as fluorocarbon resin.

The reticular structure is a structure in which a plurality of fibers is woven in the shape of a net. As shown in a partially enlarged sectional view of FIG. 3, the anti-wrinkle member 150 includes a plurality of fibers 155 woven in the shape of a net.

Figure 4:
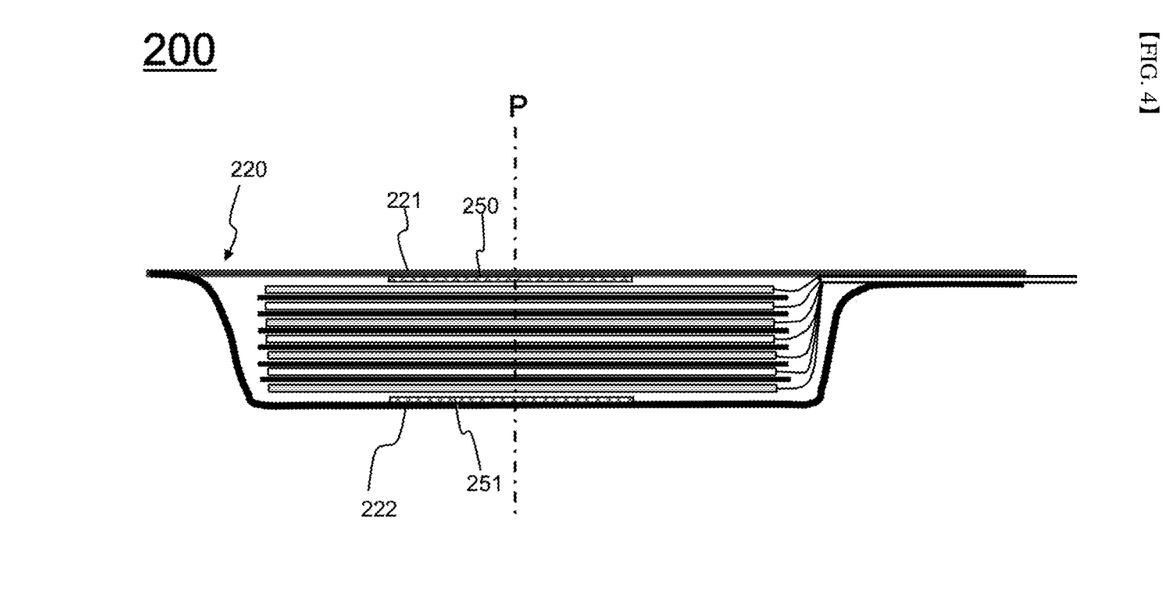
FIG. 4 is a sectional view typically showing the internal structure of a battery cell according to another embodiment of the present invention.

Meanwhile, FIG. 4 is a sectional view typically showing the internal structure of a battery cell 200 according to another embodiment of the present invention.

Referring to FIG. 4, anti-wrinkle members 250 and 251 are added to portions of the upper inner surface 221 and the lower inner surface 222 of a pouch-shaped cell case 220 adjacent to a vertical axis P passing through the middle of an electrode assembly, unlike the battery cell 100 of FIG. 3.

Generally, in the case in which a battery cell is applied to a device configured to have a curved structure in which opposite ends of the device are bent in the same direction from the middle of the device in vertical section in the axial direction thereof, most stress is concentrated on the middle portion of the battery cell. For this reason, the anti-wrinkle members 250 and 251 are added to portions of the inner surfaces of the pouch-shaped cell case 220 adjacent to the vertical axis P passing through the middle of the electrode assembly 210.

As shown in FIG. 3, the anti-wrinkle member 150, which is integrated with the pouch-shaped cell case 120, includes a plurality of fibers regularly or irregularly arranged on the inner surface of the pouch-shaped cell case 120. When the pouch-shaped cell case 120 is pressed so as to come into tight contact with the electrode assembly 110 in the state in which the electrode assembly 110 is mounted in the pouch-shaped cell case 120, the anti-wrinkle member 150 is pressed against the inner surface of the pouch-shaped cell case 120, with the result that an uneven shape 162 is formed on the surface of the pouch-shaped cell case 120.

Figure 5:
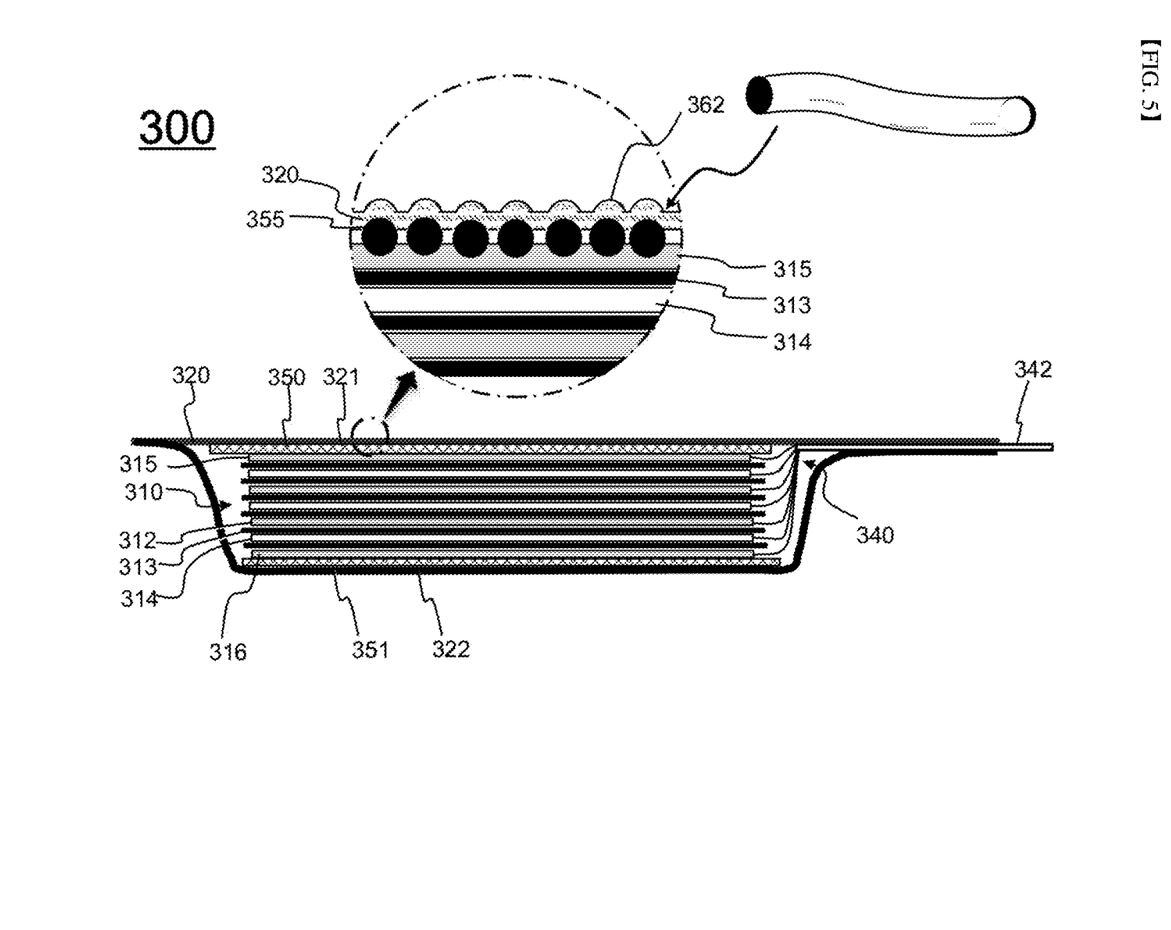
FIG. 5 is a sectional view typically showing the internal structure of a battery cell according to another embodiment of the present invention.

Meanwhile, FIG. 5 is a sectional view typically showing the internal structure of a battery cell according to another embodiment of the present invention.

Referring to FIG. 5, a battery cell 300 according to the present invention is configured to have a structure in which a stacked type electrode assembly 310, which is configured to have a structure in which sheet type positive electrodes 312 and negative electrodes 314 are stacked in the state in which separators 313 are disposed respectively between the positive electrodes 312 and the negative electrodes 314, is mounted in a pouch-shaped cell case 320 in the state in which the electrode assembly 310 is impregnated with an electrolyte (not shown). Electrode tabs 340 and electrode leads 342 are formed at one side of the battery cell 300.

The electrode assembly 310 and the pouch-shaped cell case 320 may be deformable in response to the shape of a device in which the battery cell 300 is to be mounted.

Generally, in the case in which a battery cell is bent in response to the shape of a curved device, wrinkles are formed in the upper surface or the lower surface of a pouch-shaped cell case. In order to prevent wrinkles from being formed in the upper surface or the lower surface of the pouch-shaped cell case 320 of the battery cell 300 according to the present invention, anti-wrinkle members 350 and 351 are bonded respectively to the uppermost electrode 315 of the electrode assembly 310 facing the upper inner surface 321 of the pouch-shaped cell case 320 and to the lowermost electrode 316 of the electrode assembly 310 facing the lower inner surface 322 of the pouch-shaped cell case 320.

Each of the anti-wrinkle members 350 and 351 is configured to have a reticular structure. Each of the anti-wrinkle members 350 and 351 may be made of a plastic material, such as polyethylene terephthalate (PET), or a metal material, such as aluminum. In the case in which each of the anti-wrinkle members 350 and 351 is made of a metal material, the surface of each of the anti-wrinkle members 350 and 351 is coated with an insulative material, such as fluorocarbon resin.

The reticular structure is a structure in which a plurality of fibers is woven in the shape of a net. As shown in a partially enlarged sectional view of FIG. 5, the anti-wrinkle member 350 includes a plurality of fibers 355 woven in the shape of a net.

A mixture of the electrode assembly 310 is partially introduced into the reticular structure of the anti-wrinkle member 350 such that the anti-wrinkle member 350 is integrated with the electrode assembly 310.

Figure 6:
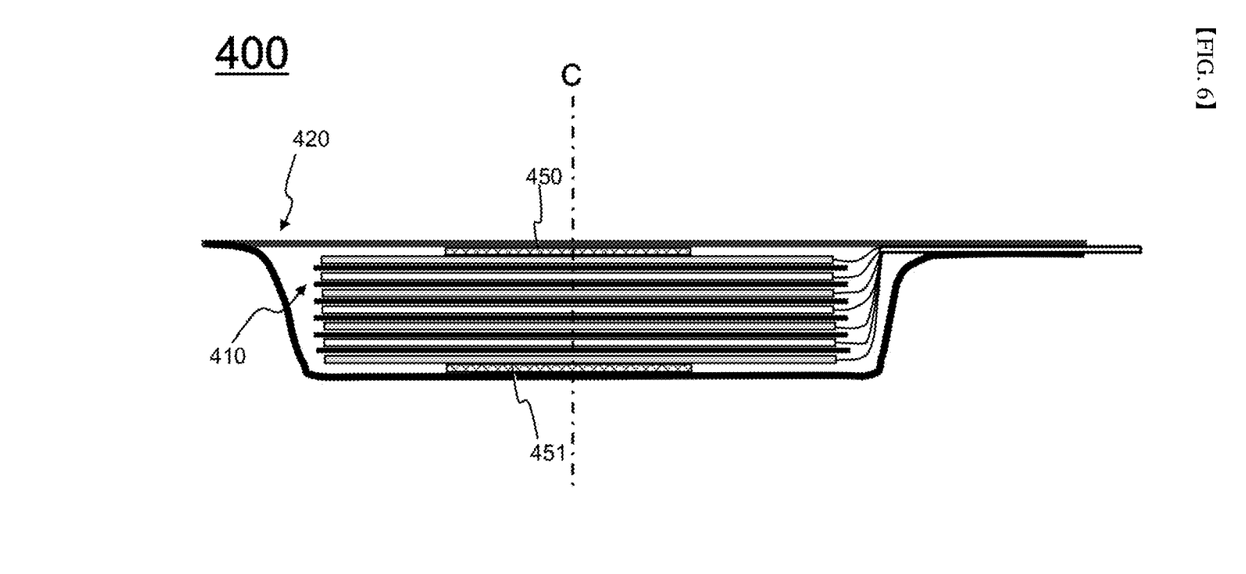
FIG. 6 is a sectional view typically showing the internal structure of a battery cell according to another embodiment of the present invention.

Meanwhile, FIG. 6 is a sectional view typically showing the internal structure of a battery cell 400 according to another embodiment of the present invention.

Referring to FIG. 6, anti-wrinkle members 450 and 451 are added to middle portions of the outer surfaces of an electrode assembly 410 adjacent to a vertical axis C passing through the middle of the electrode assembly 410, unlike FIG. 5.

Generally, in the case in which a battery cell is applied to a device configured to have a structure in which opposite ends of the device are bent in the same direction from the middle of the device in vertical section in the axial direction thereof, most stress is concentrated on the middle portion of the battery cell. For this reason, the anti-wrinkle members 450 and 451 are added to portions of the outer surfaces of the electrode assembly 410 adjacent to the vertical axis C passing through the middle of the electrode assembly 410.

As shown in FIG. 5, the anti-wrinkle member 350, which is integrated with the pouch-shaped cell case 320, includes a plurality of fibers regularly or irregularly arranged on the outer surface of the electrode assembly 310. When the pouch-shaped cell case 320 is pressed so as to come into tight contact with the electrode assembly 310 in the state in which the electrode assembly 310 is mounted in the pouch-shaped cell case 320, the anti-wrinkle member 350 is pressed against the inner surface of the pouch-shaped cell case 320, with the result that an uneven shape 362 is formed on the surface of the pouch-shaped cell case 320.

Figure 7:
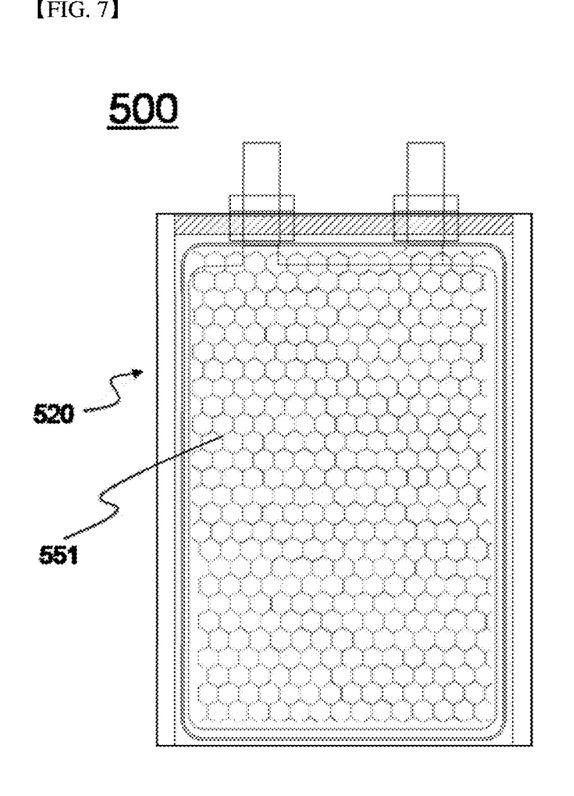
FIGS. 7 to 9 are plan views showing battery cells according to various other embodiments of the present invention.
Figure 8:
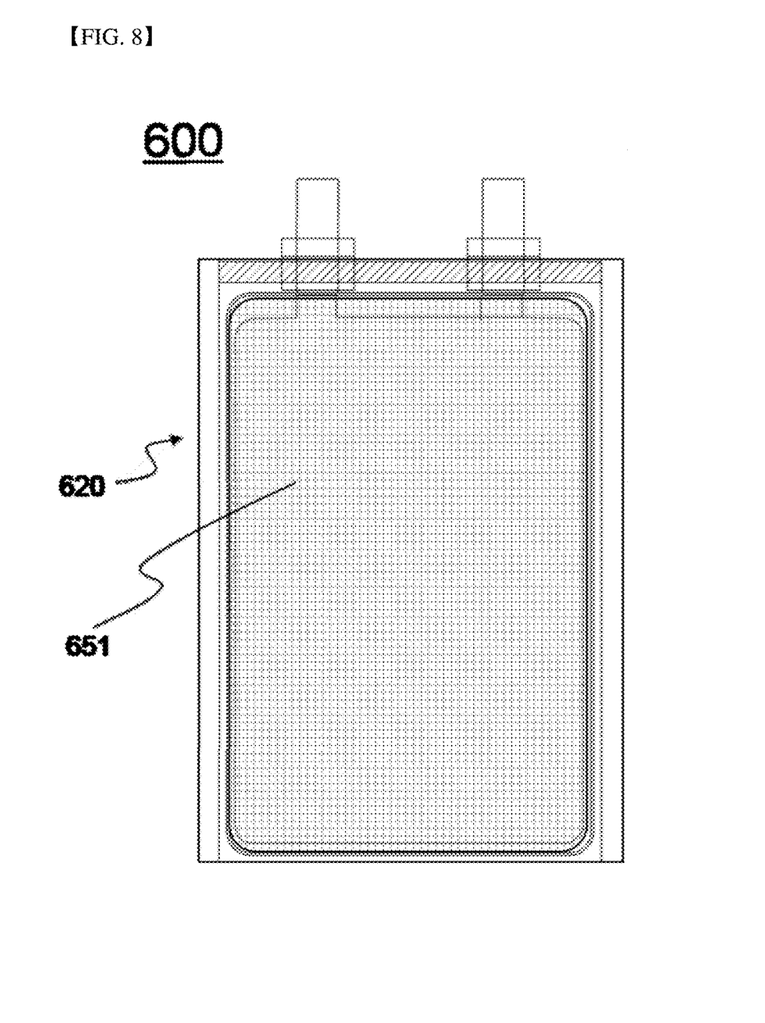
Figure 9:
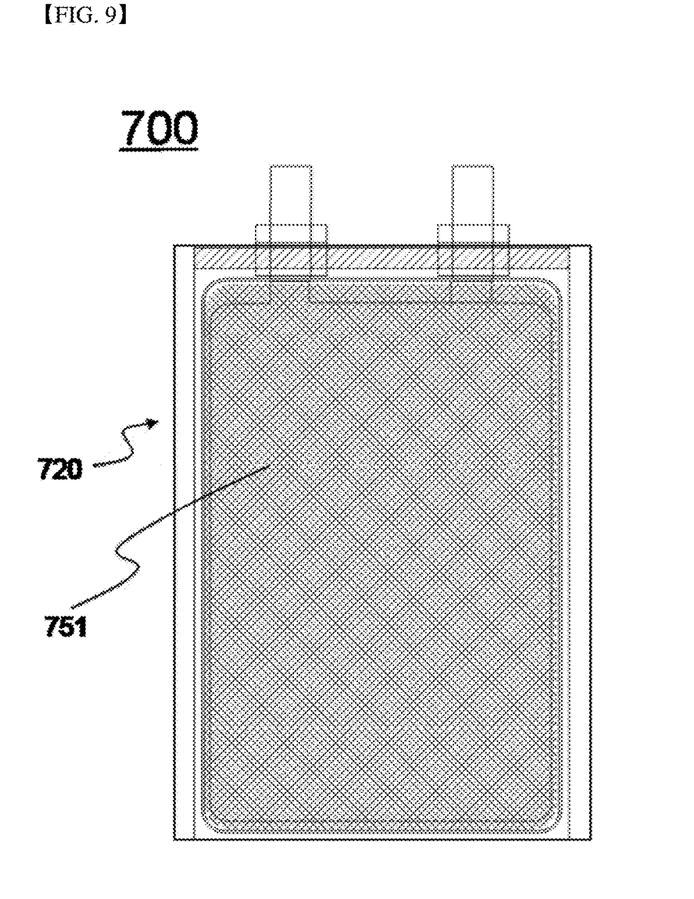

Meanwhile, FIGS. 7 to 9 are plan views typically showing battery cells with uneven shapes formed on pouch-shaped cell cases according to various other embodiments of the present invention.

Referring to FIGS. 7 to 9, a reticular structure of an anti-wrinkle member 551 of a battery cell 500 shown in FIG. 7 has a continuous honeycomb pattern when viewed from above. The continuous honeycomb pattern is formed in a pouch-shaped cell case 520. A reticular structure of an anti-wrinkle member 651 of a battery cell 600 shown in FIG. 8 has a continuous lattice pattern when viewed from above. The continuous lattice pattern is formed in a pouch-shaped cell case 620. A reticular structure of an anti-wrinkle member 751 of a battery cell 700 shown in FIG. 9 has a continuous diamond pattern when viewed from above. The continuous diamond pattern is formed in a pouch-shaped cell case 720.

However, the present invention is not limited to the embodiments shown in FIGS. 7 to 9, in each of which the size of the anti-wrinkle member is equal to the entire size of one surface of the pouch-shaped cell case. The anti-wrinkle member may have various sizes.

In addition, anti-wrinkle members having various patterns may be applied to the battery cell according to the present invention. However, the size of the uneven shape of each of the anti-wrinkle members may depend on the thickness of a pattern line, and the density of the uneven shape of each of the anti-wrinkle members may depend on a pattern pitch. Consequently, it is necessary to appropriately set the shape of the pattern based on the extent or size of curvature of a device to which the battery cell is to be applied.

As described above with reference to the drawings, the battery cell according to the present invention is configured to have a structure in which the anti-wrinkle members are added to the inner surfaces of the pouch-shaped cell case facing the outermost electrodes of the electrode assembly or to the outer surfaces of the electrode assembly such that the uneven shape is formed on the surface of the pouch-shaped cell case. When the battery cell is deformed due to implementation in devices having various designs, therefore, stress generated due to the deformation of the pouch-shaped cell case is released by the uneven shape, with the result that it is possible to maximally prevent unintentional wrinkles from being formed in the pouch-shaped cell case. Consequently, it is possible to prevent the exposure of a metal layer of the pouch-shaped cell case or the leakage of an electrolyte, which may be caused by damage to the cell case which occurs due to wrinkles formed in the pouch-shaped cell case, thereby securing the safety of the battery cell.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention, which includes an electrode assembly and a cell case that are deformable in response to the shape of a device, is configured to have a structure in which anti-wrinkle members are added to at least portions of the inner surfaces of the cell case facing the outermost electrodes of the electrode assembly or to at least portions of the outer surfaces of the electrode assembly. When the battery cell is deformed due to implementation in devices having various designs, therefore, it is possible to maximally prevent wrinkles from being formed in the cell case. Consequently, it is possible to effectively prevent the exposure of a metal layer of the pouch-shaped cell case or the leakage of an electrolyte, which may be caused by damage to the cell case which occurs due to wrinkles formed in the pouch-shaped cell case, thereby securing the safety of the battery cell.

The invention claimed is:

1. A battery cell configured to have a structure in which an electrode assembly is mounted in a cell case in the state in which the electrode assembly is impregnated with an electrolyte, wherein
the electrode assembly and the cell case are deformable in response to a shape of a device in which the battery cell is mounted, and
anti-wrinkle members, for preventing wrinkles from being formed in the cell case when the cell case is deformed, are added to at least portions of inner surfaces of the cell case facing outermost electrodes of the electrode assembly,
wherein each of the anti-wrinkle members has a reticular structure, and
wherein the reticular structure comprises a plurality of fibers woven in the shape of a net.

2. The battery cell according to claim 1, wherein the reticular structure has a continuous honeycomb pattern, a continuous lattice pattern, or a continuous diamond pattern, when viewed from above.

3. The battery cell according to claim 1, wherein each of the anti-wrinkle members is a sheet type member.

4. A battery cell configured to have a structure in which an electrode assembly is mounted in a cell case in the state in which the electrode assembly is impregnated with an electrolyte, wherein
the electrode assembly and the cell case are deformable in response to a shape of a device in which the battery cell is mounted, and
anti-wrinkle members, for preventing wrinkles from being formed in the cell case when the cell case is deformed, are added to at least portions of inner surfaces of the cell case facing outermost electrodes of the electrode assembly,
wherein each of the anti-wrinkle member is s sheet type member, and
wherein each of the anti-wrinkle member has a porous structure in which a plurality of pores is formed in the sheet type member, and
wherein the porous structure is configured such that each of the pores has a diameter of 0.1 mm to 1 mm.

5. The battery cell according to claim 4, wherein the porous structure is configured such that the pores are arranged at intervals of 300% to 1000% the diameter of each of the pores.

6. The battery cell according to claim 1, wherein each of the anti-wrinkle members is made of a polymer material.

7. The battery cell according to claim 6, wherein the polymer material is at least one selected from a group consisting of polyethylene (PE), polypropylene (PP), polystyrene (PS), polyethylene terephthalate (PET), polymethyl methacrylate (PMMA), polyacrylonitrile (PAN), silicone resin, natural rubber, and synthetic rubber.

8. The battery cell according to claim 1, wherein each of the anti-wrinkle members is made of a metal material coated with an insulative material.

9. The battery cell according to claim 8, wherein the metal material is at least one selected from a group consisting of aluminum, copper, iron, nickel, and silver.

10. The battery cell according to claim 8, wherein the insulative material is at least one selected from a group consisting of polyolefin resin, fluorocarbon resin, silicone resin, and rubber resin.

11. The battery cell according to claim 1, wherein the anti-wrinkle members are thermally welded to the inner surfaces of the cell case.

12. The battery cell according to claim 1, wherein the anti-wrinkle members are bonded to the inner surfaces of the cell case.

13. The battery cell according to claim 12, wherein the anti-wrinkle members are bonded to the inner surfaces of the cell case using an unsaturated polyester adhesive, a polyacrylate adhesive, or a silicone adhesive.

14. The battery cell according to claim 1, wherein the anti-wrinkle members are added respectively to an upper inner surface of the cell case facing an uppermost electrode of the electrode assembly and to a lower inner surface of the cell case facing a lowermost electrode of the electrode assembly.

15. The battery cell according to claim 1, wherein the anti-wrinkle members are added to portions of inner surfaces of the cell case adjacent to a vertical axis passing through a middle of the electrode assembly.

16. The battery cell according to claim 15, wherein the anti-wrinkle members are added such that a middle of each of the anti-wrinkle members is located on the vertical axis passing through the middle of the electrode assembly and wherein the anti-wrinkle members are added to portions of the inner surfaces of the cell case equivalent to 20% to 100% an entire area of the electrode assembly.

17. The battery cell according to claim 1, wherein each of the anti-wrinkle members has a thickness of 0.1 µm to 150 µm.

18. The battery cell according to claim 1, wherein the cell case is a pouch-shaped case made of a laminate sheet comprising a resin layer and a metal layer.

19. The battery cell according to claim 1, wherein the electrode assembly has a plate-shaped structure and wherein the electrode assembly is a stacked type electrode assembly configured to have a structure in which sheet type positive electrodes and negative electrodes are stacked in the state in which separators are disposed respectively between the positive electrodes and the negative electrodes, a stacked/folded type electrode assembly configured to have a structure in which predetermined numbers of positive electrodes and negative electrodes are sequentially stacked in the state in which separators are disposed respectively between the positive electrodes and the negative electrodes to constitute a bi-cell or a full cell, and then a plurality of bi-cells or full cells is folded using a separation film, or a laminated/stacked type electrode assembly configured to have a structure in which bi-cells or full cells are stacked in the state in which separators are disposed respectively between the bi-cells or the full cells.

20. A battery pack comprising two or more battery cells according to claim 1.

21. A device comprising a battery pack according to claim 20 as a power source.

22. The device according to claim 21, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

23. A battery cell configured to have a structure in which an electrode assembly is mounted in a cell case in the state in which the electrode assembly is impregnated with an electrolyte, wherein
the electrode assembly and the cell case are deformable in response to a shape of a device in which the battery cell is mounted, and
anti-wrinkle members, for preventing wrinkles from being formed in the cell case when the cell case is deformed, are added to at least portions of inner surfaces of the cell case facing outermost electrodes of the electrode assembly,
wherein each of the anti-wrinkle members has a reticular structure, and
wherein the reticular structure has a continuous honeycomb pattern, a continuous lattice pattern, or a continuous diamond pattern, when viewed from above.

24. A battery cell configured to have a structure in which an electrode assembly is mounted in a cell case in the state in which the electrode assembly is impregnated with an electrolyte, wherein
the electrode assembly and the cell case are deformable in response to a shape of a device in which the battery cell is mounted, and
anti-wrinkle members, for preventing wrinkles from being formed in the cell case when the cell case is deformed, are added to at least portions of inner surfaces of the cell case facing outermost electrodes of the electrode assembly,
wherein each of the anti-wrinkle member is s sheet type member, and
wherein each of the anti-wrinkle member has a porous structure in which a plurality of pores is formed in the sheet type member, and
wherein the porous structure is configured such that the pores are arranged at intervals of 300% to 1,000% the diameter of each of the pores.

25. A battery cell configured to have a structure in which an electrode assembly is mounted in a cell case in the state in which the electrode assembly is impregnated with an electrolyte, wherein
the electrode assembly and the cell case are deformable in response to a shape of a device in which the battery cell is mounted, and
anti-wrinkle members, for preventing wrinkles from being formed in the cell case when the cell case is deformed, are added to at least portions of inner surfaces of the cell case facing outermost electrodes of the electrode assembly,
wherein each of the anti-wrinkle members has a reticular structure, and
wherein the anti-wrinkle members are bonded to the inner surfaces of the cell case using an unsaturated polyester adhesive, a polyacrylate adhesive, or a silicone adhesive.

* * * * *